United States Patent [19]

Kubetin

[11] Patent Number: 4,559,712

[45] Date of Patent: Dec. 24, 1985

[54] CUTTER TIP MEASURING DEVICE

[76] Inventor: William T. Kubetin, 50 E. 209th St., Euclid, Ohio 44123

[21] Appl. No.: 604,981

[22] Filed: Apr. 27, 1984

[51] Int. Cl.[4] .................................................. G01B 5/20

[52] U.S. Cl. ...................................... 33/201; 33/1 BB; 33/571; 33/501

[58] Field of Search .................. 33/168 R, 1 B, 1 BB, 33/174 R, 494, 488, 201; 350/110, 114–116, 243, 244, 247, 254; 356/69, 397, 381-383, 394, 376, 242, 397

[56] References Cited

U.S. PATENT DOCUMENTS

| | | | |
|---|---|---|---|
| 1,549,518 | 8/1925 | Steinle | 356/397 X |
| 1,798,953 | 3/1931 | Rennicke | 350/116 |
| 2,241,690 | 5/1941 | Williams . | |
| 2,241,691 | 5/1941 | Williams . | |
| 2,241,693 | 5/1941 | Williams . | |
| 2,355,161 | 8/1944 | Holstein . | |
| 2,376,811 | 5/1945 | Rigby | 33/1 B |
| 2,389,544 | 11/1945 | Peck et al. | 356/394 |
| 2,630,631 | 3/1953 | McMullen | 33/1 B X |
| 2,740,296 | 4/1956 | Andres . | |
| 4,324,050 | 4/1982 | Weir . | |
| 4,331,381 | 5/1982 | Hunter . | |

FOREIGN PATENT DOCUMENTS

| | | | |
|---|---|---|---|
| 108917 | 11/1943 | Sweden . | |
| Ad.24363 | of 1912 | United Kingdom | 33/168 R |

OTHER PUBLICATIONS

IBM Tech Disc Bull, "Sliding Comparator Graticule Acessory", by A. H. Ett, vol. 15, #8, 1/73.

*Primary Examiner*—Harry N. Haroian
*Attorney, Agent, or Firm*—Fay, Sharpe, Fagan Minnich & McKee

[57] ABSTRACT

A portable measuring device includes a template for measuring the width of an associated cutter tip. A plurality of spaced width indicator marks of different sizes are provided on the template member. A magnifying member is provided for magnifying at least one of the plurality of width marks. A housing member is provided for slidably supporting the magnifying member on the template member.

20 Claims, 7 Drawing Figures

CUTTER TIP MEASURING DEVICE

BACKGROUND OF THE INVENTION

This invention generally pertains to measuring devices. More specifically, the present invention relates to a matching type cutter tip measuring device.

The invention is particularly applicable to conical single lip or tip V-shaped engraving cutters. However, it will be appreciated by those skilled in the art that the invention has broader application and may also be adapted for use in many other environments, e.g. cutter tip measurement of other types of cutters.

Heretofore, conventional measuring devices for cutters have included expensive optical comparators which necessitated that the cutter be removed from a cutter grinder during the inspection process. One type of comparator is a projection type comparator which works by projecting, with an extremely accurate lens, an enlarged (20X) image of the cutter onto a screen consisting of a reticle or grid containing various scales for measuring tip width, cutter angles, etc. Projection comparators are, however, exceptionally expensive and also have the disadvantage that the cutter must be removed from a cutter grinder during the resharpening process in order to measure the tip width.

Another cutter measuring alternative is the use of a cutter measuring microscope. This device is essentially a microscope with a built-in reticle for measuring cutter widths. This instrument is also quite expensive and also requires that the cutter be removed from the cutter grinder for measurement.

A much less expensive instrument for measuring cutter width is a conventional pocket comparator. This device consists of a low power magnifier having a graduated glass or plastic reticle on its bottom allowing one to visually approximate cutter sizes as well as the width of engraved grooves. Although this device is quite ecomonical, the minimum measuring graduations, which may be 0.005 inches, are difficult to read. Also, optical parallax can cause misleading measurements.

A further problem with all of the measuring devices mentioned is that it is difficult, at best, to directly measure a cutter tip since the angle of the tip coupled with the cutter tip clearance causes the cutter tip to measure smaller than it actually cuts.

Accordingly, it has been considered desirable to develop a new and improved cutter measuring device which would overcome the foregoing difficulties and others while providing better and more advantageous overall results.

BRIEF SUMMARY OF THE INVENTION

In accordance with the present invention, a new and improved cutter measuring device is provided which can more easily measure cutter tip widths.

More particularly in accordance with the invention, a portable measuring device includes template means for measuring the width of an associated cutter tip, the template means having a plurality of spaced width indicator marks of different sizes. Magnification means are provided for magnifying at least one of the plurality of width marks. Housing means are also provided for slidably supporting the magnification means on the template means.

In accordance with another aspect of the invention, the template means includes a template member having the plurality of width indicator marks along a longitudinal edge thereof as well as a transparent support member. Fastening means are provided for fastening the template member to a first side of the support member.

According to another aspect of the invention, the support member extends past a first longitudinal edge of the template member and the magnification means is positioned adjacent a second side of the support member. A width comparison is made when the associated cutter tip is positioned against the support member and abuts one of the plurality of width indicator marks which can be viewed through the magnification means.

According to a further aspect of the invention, the template member is provided with a plurality of width indicator marks along a second longitudinal edge as well.

In accordance with a still further aspect of the invention, the housing means includes a U-shaped housing member which substantially encloses a portion of the template means.

According to still another aspect of the invention, securing means are operatively connected to the housing member for selectively securing the housing member to the template means.

In accordance with yet another aspect of the invention, a plurality of measuring lines are provided on one leg of the U-shaped housing member for measuring the width of an engraved line.

According to still yet another aspect of the invention, the magnification means includes a first magnifier lens which can be moved toward or away from the template means to focus the image.

According to yet still another aspect of the invention, a second magnifier lens may also be provided which may be selectively positioned to cooperate with the first magnifier lens to enlarge the image provided by the first magnifier lens.

In accordance with still a further aspect of the invention, a plurality of spaced groove width numbers are provided on the template means, with one being positioned underneath each of the width indicator marks. The groove width numbers indicate the width of the groove cut by the associated cutter tip matching the width shown by the groove width indicator mark. Preferably, the cutter is a single lip rotary cutter and each of the groove width numbers indicates a larger dimension than the width indicator mark positioned above the groove width number to compensate for the fact that the associated cutter will cut a groove wider than the cutter tip width.

The principal advantage of the present invention is a provision of a new cutter tip measuring device which can more easily measure a cutter tip width without having to remove the cutter from a cutter grinder during the cutter's resharpening for the measuring.

Another advantage of the invention is the provision of a plurality of cutter width measurements on the template means so that the width of various sizes of cutters can be matched against the cutter tip widths provided on the template. This makes measurement easy since either the cutter matches the width shown on the template or it doesn't. In this way, there are no tiny gradations or graduations to count.

Yet another advantage of the invention is the provision of groove width numbers provided for each of the cutter width measurements which width numbers are made to approximately correspond with the various widths of cutter end flats being measured. If the cutter is a single lip rotary V-shaped engraving cutter, the end flat measures somewhat less than the actual cut due to clearance ground on the end and back edge of the cutter. The numerals provided on the gauge correspond not to the width of the cutter end flat, but to the somewhat larger width which is cut by such an engraving cutter.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein.

DETAILED DESCRIPTION OF THE PREFERRED AND ALTERNATE EMBODIMENTS

Figure 1:
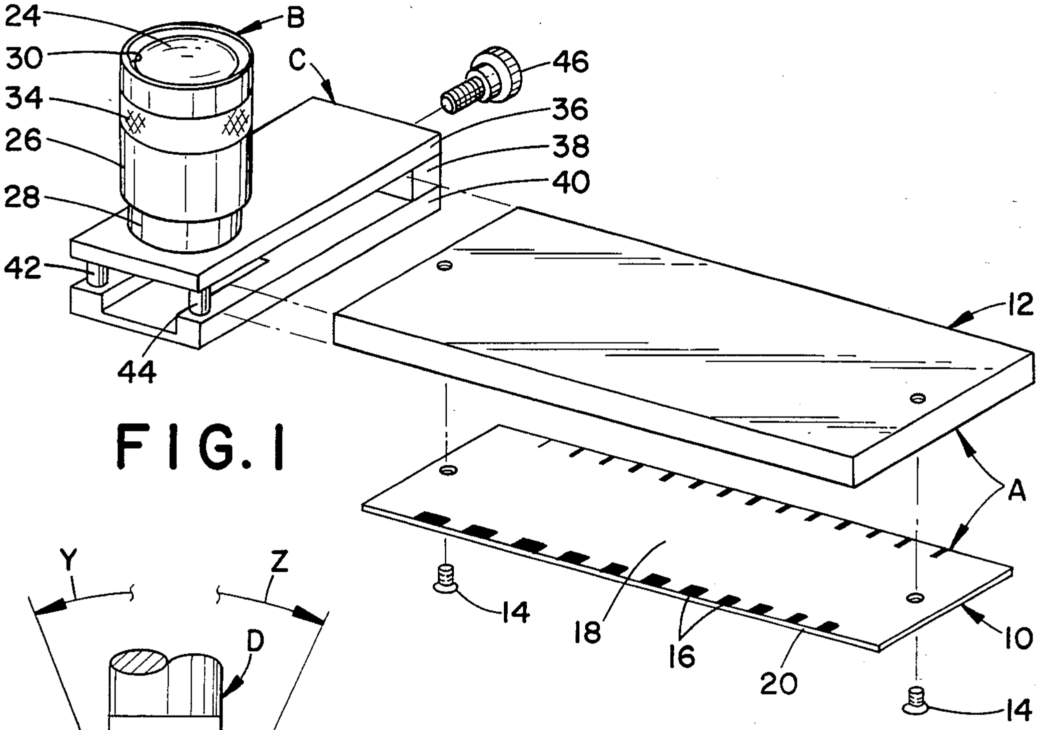
FIG. 1 is an exploded perspective view of the preferred embodiment of the subject new cutter measuring device.

Referring now the drawings wherein the showings are for purposes of illustrating preferred and alternate embodiments of the invention only and not for purposes of limiting same, FIG. 1 shows the subject new cutter measuring device. While the cutter measuring device is primarily designed for measuring the tip width of a conical, single lip or tip V-shaped engraving cutter having a 60° included cutter angle, a 40° clearance angle, and a 7° rake angle, it will be appreciated that the overall inventive concept involved could be adapted for use in other cutter measuring environments as well.

More particularly, the present invention includes a template means A, a magnification means B, and a housing means C. The template means A includes a gauge plate 10, a support plate 12, and fasteners 14 for fastening together the gauge plate and the support plate. The gauge plate 10 is provided with a plurality of differently sized width indicator marks 16 on an upper surface 18 thereof. These marks are positioned along at least one longitudinal edge 20 of the gauge plate 10. Underneath each of the width indicator marks 16 is a numerical measurement 22 (see FIG. 3).

The magnification means B includes a magnifier lens 24 provided in a support barrel 26. The lens 24 may be a six power lens although it could instead provide a greater magnification, such as twenty power. The support barrel 26 is, in turn, supported on a support cylinder 28 which is secured to the housing means C. An O-ring or a similar support member 30 may be provided in the support barrel 26 for accurately spacing and supporting the lens 24 in the barrel. A groove 32 (see FIG. 2) is provided in the support cylinder 28 with a portion of the support barrel 26 riding in the groove 32. The support barrel 26 may be rotated by grasping a roughened portion 34 to rotate the barrel and move the magnifier lens 24 up and down on the support cylinder 28. This enables the magnifier lens 24 to focus the image to be observed.

The housing means C is essentially a U-shaped body and includes a first leg 36, a base portion 38, and a second leg 40. The first leg 36 supports the support cylinder 28. First and second support arms 42, 44 connect the free end of the first leg 36 to the free end of the second leg 40. The housing means C thus encloses a portion of the template means A.

Figure 2:
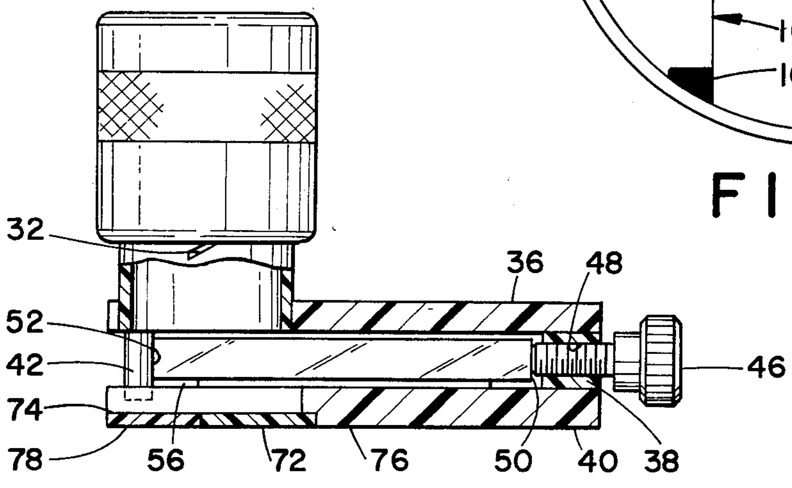
FIG. 2 is a side elevational view of the cutter measuring device of FIG. 1 in partial cross section.

With reference now to FIG. 2, a threaded fastener 46 is provided in a threaded aperture 48 of the base portion 38 of the housing means C. When the fastener 46 is threaded into the threaded aperture 48 it will abut a rear edge 50 of the support plate 12 thereby pushing a front edge 52 of the support plate against the first and second arms 42, 44 to lock the template means A in a particular position in the housing means C.

Figure 3:
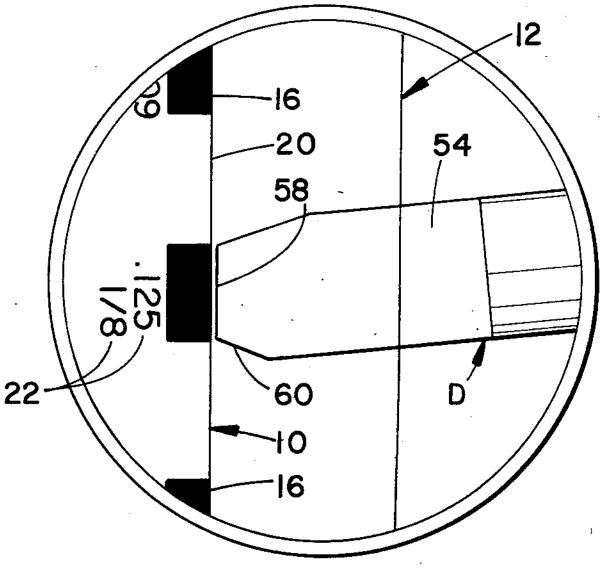
FIG. 3 is a greatly enlarged plan view looking through an eyepiece of the cutter measuring device of FIG. 2 while in the process of measuring a cutter tip width.

With reference now to FIG. 3, a cutter D may be positioned in working association with the cutter measuring device. A flat side 54 of the cutter D extends underneath the support plate 12 and contacts a first side 56 thereof. A cutter tip 58 of the cutter D contacts the first longitudinal edge 20 of the gauge plate 10. In this way, the cutter tip 58 is immediately adjacent one of the width indicator marks 16 to meausure its width.

The cutter D is a conical, single lip V-shaped cutter having an included cutting angle Z of approximately 60°, an included clearance angle Y of approximately 40° and a rake or a tip angle X of approximately 7°. These angles are fairly standard for the production of a rotary single lip engraving cutter meant to be used in cutting various materials, such as soft plastics, phenolic or acrylic plastics, pewter, brass, or aluminum. For a harder type material, such as stainless steel, a clearance angle of 20° to 25° might be used. This decreased clearance angle will provide a stronger tip which will be less prone to breaking in the strong material during the cutting process. A cutting edge 60 of the cutter D, adjacent the cutter tip 58, is the actual portion of the cutter which digs into the material to form a groove. The cutters D can be of different diameters, such as one-quarter, eleven-sixtyfourths, or one-eighth inches.

Figure 4:
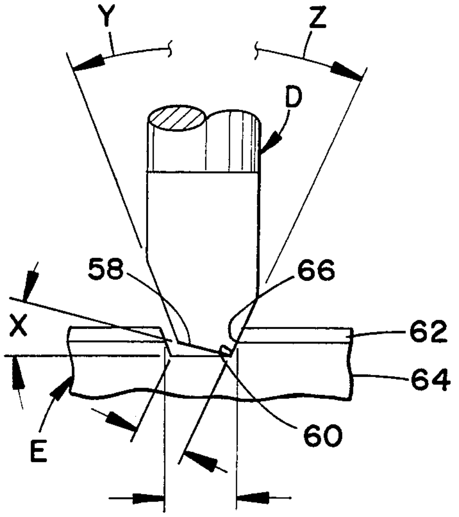
FIG. 4 is a side elevational view of a cutter forming a groove in an associated sheet of material.

One typical type of material E, which is meant to be cut by the cutter D, is illustrated in FIG. 4. The material E is made of two plastic sheets 62, 64 laminated to each other. The cutter D is adapted to cut through the top sheet or cap sheet 62 until it encounters the bottom sheet 64, which is preferably a different color. The cutters are generally used in conventional pantograph or the newer computerized rotary engraving apparatus to cut a predetermined design into the dual colored plastic material E. These designs are typically words, numbers or lines. After engraving, such dual colored plastic materials E may be used as nameplates, signs, directory strips, push buttons or instrument panels. Additionally, the cutter D of the present invention may be used in machine shops to cut indicator marks into die blocks or to carve out heat sinks from a metal alloy, for example.

When the cutter tip 58 of the cutter D matches up with one of the width indicators 16 on the template means A, a person knows that the cutter has been machined to the correct cutter tip width. At this point, the person will be able to tell also what width of groove the cutter will make in a material. This width is indicated by the numerical designations 22 immediately adjacent each other one of the width indicators 16 (such designations are not indicated in FIG. 1 for the sake of simplicity). These designations 22 are somewhat larger than the widths of the cutter tips 58 of the cutters D. In other words, the cutter tip width 58 is always slightly smaller in size than the actual groove or cut 66 made by the cutter D. For example, although a 0.125 inch number is shown in FIG. 3, that number is associated with a cutter tip width of approximately 0.112 inches. That is, the blade tip width distance indicated by the width indicator 16 is 0.112 inches whereas the number 22 shown is 0.125 inches since the groove 66 which will be cut into the material will be approximately 0.125 inches.

The width of the engraved groove 66 is determined when the rotating cutter tip has engraved to a 0.003 inch depth into the lower plastic material 64. In other words, in engraving a laminated plastic stock material it is assumed that one would normally cut approximately 0.003 inches deeper than the cap sheet 62 and this "color break" is what visually defines the cutting width. This means that the actual line width engraved is measurable where the top color changes to the core color below. The point of the cutter penetrates 0.003 inches below this boundary zone to insure that enough core material is cut away to provide a clean contrasting line.

Smaller or larger top laminate thicknesses will produce equal line widths when measured at the point of color change. Other definitions have given the tip size in terms of a groove which is engraved to 0.008 inches deep into the underlying material 64; however, the differences in tip size as measured by these two methods is rather slight.

The support plate 12 is preferably made of a transparent plastic material. This material, however, can be scratched by the cutter D when its tip is measured against the gauge plate 10. For this reason, the fasteners 14 are preferably detachable from an old scratched support plate to enable a new, and unscratched, support plate to be secured to the gauge plate 10.

In the preferred embodiment, twenty-five tip width marks are provided for cutter sizes from 0.01 inches through 0.075 inches in 0.005 inch increments and also in 1/64th inch increments from 0.075 inches through 0.025 inches. The tip widths can, of course, be indicated both in fractions and in decimals as shown in FIG. 3. Tip width marks can be provided along both longitudinal edges of the gauge plate 10 if desired. The housing means C can be slid off the template means A and rotated 180° about a vertical axis and then slid back on the template means so that the width marks along the second longitudinal edge of the template means can be viewed. Of course, more or fewer tip widths or tip widths of different sizes could also be shown as desired. It should also be noted that a metric scale could be used instead of the inch scale provided to the same effect.

The cutting and clearance angles disclosed herein were chosen as those most frequently used in the engraving industry. However, the cutter measuring device of the present invention could also be used for sharpening cutters with different cutting angles, clearance angles, and rake angles as desired. For example, when using the apparatus for measuring cutters sharpened to a 45° included angle the width of the groove cut will not be significantly changed. The same markings on the gauge plate 10 can be used for cutters ground to other angles and clearance sizes since, in many cases, the difference in the groove cut will be very slight.

The housing means C is preferably made of a transparent material, such as a clear plastic, to allow light into the eyepiece from all angles.

Figure 5:
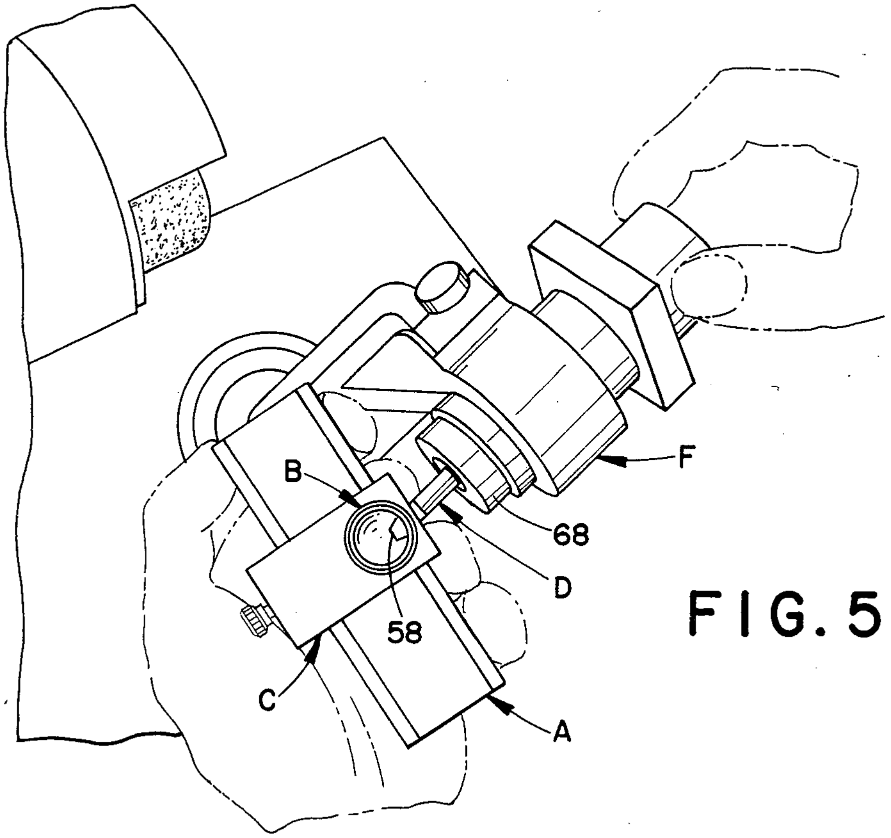
FIG. 5 is a perspective view of the cutter measuring device of FIG. 1 being used to measure a cutter tip width while the cutter is still in a cutter grinder.

With reference now to FIG. 5, one of the major advantages of the present invention is that the cutter tip width 58 of a cutter D can be measured even when the cutter is mounted in a conventional cutter grinder F. Such conventional cutter grinders are manufactured, for example, by the New Hermes Corporation. A cutter can be positioned in a grinder collet 68 and can be ground to the desired cutting and clearance angles. Enough material is removed to restore the cutting edge and the cutter measuring device of the present invention can then be used to inspect the cutter edges while the cutter remains colleted in the grinder. The grinder F may then be started again to remove enough material from the cutter tip 58 until the cutter tip width matches the width of a particular width indicator mark 16.

Figure 6:
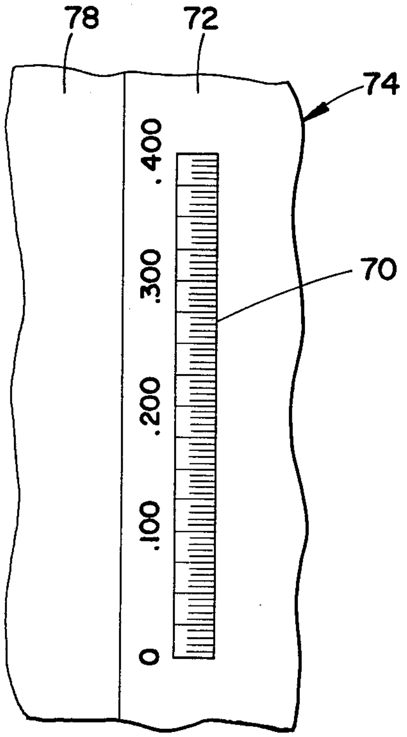
FIG. 6 is a greatly enlarged plan view of a transparent reticle portion of the cutter measuring device as viewed through the eyepiece; and, FIG. 7 is a plan view of an alternate embodiment of the cutter measuring device according to the present invention.

With reference now to FIG. 6, a scale or reticle 70, calibrated in 0.005 inch increments may be provided in a transparent portion 72 of an indented section 74 of the housing means second leg 40. This leg section, section 74, is indented to allow the cutter flat portion 54 to fit underneath the support body lower surface 56 in the housing means C so that the magnification means B can magnify the image. The reticle 70 may be used to check the accuracy of the cutter by measuring the width of a test cut made in the material to be cut. The reticle 70 is used by placing a lower surface 76 of the second leg 40 over the groove to be measured and, after the template means is removed, adjusting the support barrel 26 of the magnifying lens 24 to focus the image.

The lower leg indented section 74 also has a colored portion 78 which provides a contrast when the cutter tip is viewed through the magnifying lens. This colored portion 78 may, for example, be provided with an opaque white color.

Figure 7:
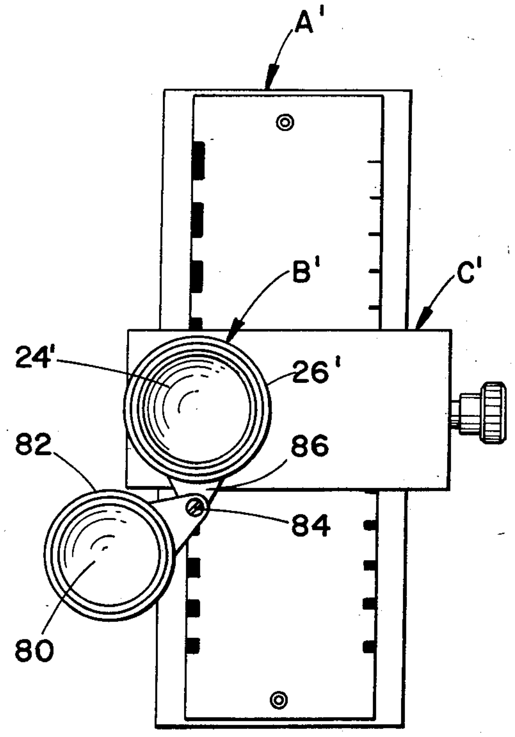

With reference now to the alternate embodiment of FIG. 7, the invention is there shown as having an auxiliarly magnifying lens. For ease of illustration and appreciation of this alternative, like components are identified by like numerals with a primed suffix (′) and new components are identified by new numerals.

In this FIGURE, the magnification means B′ is shown as having a magnifier lens 24′ as well as a second magnifying lens 80 supported in a holder 82. The holder 82 is rotatably secured, such as by a suitable fastener 84, to a support frame 86 which is coupled to a lens support barrel 26′. The second magnifying lens 80 is thus capable of being selectively positioned over the first magnifying lens 24′. In this way, additional magnification may be provided where necessary, such as for a particularly narrow width of cutter tip or groove.

Although the second magnifying lens 80 has been shown as being secured to the lens support barrel 26′, it would also be quite feasible to provide a separate add-on lens in a rubber or plastic housing which can be snapped on the lens support barrel. In this way, a second lens can be added when desired but detached from the magnification means when not required.

Although a rectangular template means A has been illustrated, it would, of course, be quite feasible to provide a circular template means and an associated housing means (for the magnifying means) which rotates instead of sliding. Also, although separate gauge plate and support plates are shown, they could be made a unitary structure if desired.

The subject invention provides a cutter tip measuring device for cutters, such as rotary single lip cutters, used for engraving or other such purposes. The present invention also provides a simple and effective way of measuring the width of a cutter tip and a groove to be cut by the cutter without having to remove the cutter from a cutter grinder. The present invention has a groove width numeral associated with each cutter tip width mark, with the groove width numeral indicating a larger width dimension than the associated cutter tip width mark to compensate for the fact that the associated cutter tip cuts a groove wider than the cutter tip width. Moreover, the present invention avoids the cost of a projection type comparator or a microscope as well as the inaccuracy afforded by a pocket comparator.

The invention has been described with reference to preferred and alternate embodiments. Obviously, alterations and modifications will occur to others upon a reading and understanding of this specification. It is intended to include all such modifications and alterations insofar as they come with the scope of the appended claims or the equivalents thereof.

I claim:

1. A portable measuring device comprising:

template means for measuring the width of an associated cutter tip, said template means having a plurality of spaced width indicator marks of different sizes positioned along at least one periphery thereof;

magnification means for magnifying at least one of said plurality of width marks; and, housing means for slidably supporting said magnification means on said template means, an aperture being provided in said housing means adjacent said one periphery so that a width comparison can be made on said cutter tip when positioned in said aperture against said one periphery and aligned with one of said plurality of width indicator marks.

2. The measuring device of claim 1 wherein said template means comprises:

a rectangular template member, said plurality of width indicator marks being positioned along a longitudinal edge of said template member;

a transparent support member; and, fastening means for fastening said template member to a first side of said support member.

3. The measuring device of claim 2 wherein said support member extends past said longitudinal edge of said template member, and wherein said magnification means is positioned adjacent a second side of said support member.

4. The measuring device of claim 2 wherein said template member is provided with a plurality of width indicator marks along a second longitudinal edge.

5. The measuring device of claim 1 wherein said housing means includes a U-shaped housing member which substantially encloses a portion of said template means.

6. The measuring device of claim 5 further comprising securing means operatively connected to said housing member for selectively securing said housing member at a selected position on said template means.

7. The measuring device of claim 5 wherein a plurality of measuring lines are provided on one leg of said U-shaped housing member for measuring the width of an engraved line.

8. The measuring device of claim 1 wherein said magnification means includes a first magnifier lens which can be moved toward and away from said template means to focus the image.

9. The measuring device of claim 8 further comprising a second magnifier lens which may be selectively positioned to cooperate with said first magnifier lens to enlarge the image provided by said first magnifier lens.

10. The measuring device of claim 1 further comprising a plurality of spaced groove width numbers, one positioned underneath each of said plurality of width indicator marks for indicating the width of a groove cut by said associated cutter tip.

11. The measuring device of claim 10 where said associated cutter is a single lip rotary cutter and wherein each of said groove width numbers indicates a larger dimension than said width indicator mark positioned above said groove width number to compensate for the fact that said associated cutter cuts a groove wider than said cutter tip width.

12. A portable measuring device for measuring cutter tip widths and the like by a matching process, comprising:

a template provided with a plurality of width indicator marks along an edge thereof;

a transparent support member to a first side of which said template is secured;

a magnifying lens for magnifying at least one of said plurality of width indicator marks; and, housing means for slidably supporting said magnifying lens on said support member, said lens being positioned on a second side of said support member, wherein said support member extends past said edge of said template and wherein an associated cutter tip is braced against said first side of said support member abutting one of said plurality of width indicator marks to measure said cutter tip's width.

13. The measuring device of claim 12 further comprising securing means for selectively securing said housing means with respect to said support member.

14. The measuring device of claim 12 wherein the magnification of said lens may be varied.

15. The measuring device of claim 12 wherein a plurality of width markings are also provided along a second longitudinal edge of said template.

16. The measuring device of claim 15 wherein said housing means is detachable from said support member and is rotatable by approximately 180° around a vertical axis and is then reattachable to said support member whereby said lens can magnify said plurality of markings along said second longitudinal edge of said template.

17. The measuring device of claim 12 wherein a plurality of additional measuring lines are provided on said housing means, said lines being useful for measuring the width of engraved lines.

18. The measuring device of claim 17 wherein said plurality of measuring lines are only visible when said housing means is detached from said support member.

19. The measuring device of claim 12 further comprising a groove width number associated with each of said plurality of width indicator marks for indicating the width of a groove cut by an associated single lip rotary cutter and wherein each said groove width number indicates a larger width dimension than said associated width indicator mark to compensate for the fact that said associated cutter cuts a groove wider than said cutter tip width.

20. The measuring device of claim 12 wherein said template is rectangular and said edge thereof is a longitudinal edge.

* * * * *